United States Patent
Rossi et al.

(10) Patent No.: US 11,958,717 B2
(45) Date of Patent: Apr. 16, 2024

(54) ELEVATOR BRAKE

(71) Applicant: KONE Corporation, Helsinki (FI)

(72) Inventors: Janne Rossi, Helsinki (FI); Henri Wenlin, Helsinki (FI); Asmo Tenhunen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1427 days.

(21) Appl. No.: 16/360,768

(22) Filed: Mar. 21, 2019

(65) Prior Publication Data

US 2019/0315593 A1    Oct. 17, 2019

(30) Foreign Application Priority Data

Apr. 16, 2018 (EP) .................................. 18167473

(51) Int. Cl.
| | | |
|---|---|---|
| *B66B 1/32* | (2006.01) | |
| *B66B 5/00* | (2006.01) | |
| *F16D 66/00* | (2006.01) | |
| *F16D 121/20* | (2012.01) | |

(52) U.S. Cl.
CPC .............. *B66B 1/32* (2013.01); *B66B 5/0031* (2013.01); *B66B 5/0037* (2013.01); *F16D 2066/005* (2013.01); *F16D 2121/20* (2013.01)

(58) Field of Classification Search
CPC ....... B66B 1/32; B66B 5/0031; B66B 5/0037; F16D 2066/005; F16D 2121/20; F16D 66/00; F16D 2066/001; F16D 2066/003; B66D 5/14; B66D 5/30
See application file for complete search history.

(56) References Cited

U.S. PATENT DOCUMENTS 6,095,289 A * 8/2000 Ray ...................... F16D 66/00
                                                                    188/1.11 R
2017/0313550 A1    11/2017 Vakkamäki et al.

FOREIGN PATENT DOCUMENTS

| CN | 202988638 U | 6/2013 |
| CN | 203255827 U | 10/2013 |
| CN | 103967976 A | 8/2014 |
| CN | 107110727 A | 8/2017 |

(Continued)

OTHER PUBLICATIONS

European Search Report, issued in Application No. 18 16 7473, dated Oct. 16, 2018.

(Continued)

*Primary Examiner* — Jeffrey Donels
(74) *Attorney, Agent, or Firm* — Birch, Stewart, Kolasch & Birch, LLP

(57) ABSTRACT

An elevator brake includes a frame part including an electromagnet; a moving armature movably supported on the frame part; at least one energy storage, such as a work spring, arranged between the frame part and the moving armature; a friction lining associated with the moving armature and fitted to engage a braking surface with a normal force originating from the at least one energy storage, to brake movement of an elevator car or to hold the elevator car standstill; and a sensor system including one or more sensors mounted into the elevator brake and adapted to sense one or more operational parameters of the elevator brake and/or to directly measure normal force of the friction lining.

20 Claims, 3 Drawing Sheets

(56) References Cited

FOREIGN PATENT DOCUMENTS

| CN | 107207199 A | 9/2017 | |
|---|---|---|---|
| CN | 107337046 A | 11/2017 | |
| DE | 10 2014 213 404 A1 | 1/2016 | |
| JP | 2008-222394 A | 9/2008 | |
| JP | 2017-114639 A | 6/2017 | |
| WO | WO-2010061050 A1 * | 6/2010 | ............ B60T 13/748 |
| WO | WO 2012/101091 A1 | 8/2012 | |
| WO | WO 2015/188827 A1 | 12/2015 | |

OTHER PUBLICATIONS

Japanese Office Action for Japanese Application No. 2019-060444, dated Aug. 30, 2022, with an English translation.

* cited by examiner

ELEVATOR BRAKE

TECHNICAL FIELD

The invention concerns in general the technical field of elevators. Especially the invention concerns a solution for monitoring an operation of elevator brakes.

BACKGROUND

Typically, an elevator has a number of electromagnetic brakes, normally two brakes, to brake the movement of an elevator car. The elevator brakes may be implemented as hoisting machinery brakes, which are mounted to an elevator hoisting machine and the brakes act on a traction sheave or a rotating axis of the hoisting machine to brake the movement of the traction sheave and thus the movement of the elevator car. Alternatively, the brakes may be implemented as elevator car brakes, which are mounted to the elevator car and the brakes act on guide rails to directly brake the movement of the elevator car. Typically, an elevator brake comprises a brake frame and an armature, which is movably supported on the brake frame. Furthermore, the brake frame comprises an electromagnet, which acts against braking force generated by a number of work springs, i.e. thrust springs, arranged between the brake frame and the armature. The brake may be opened by supplying current to the electromagnet and the brake is applied by interrupting the current supply.

The elevator brakes are safety devices and thus the operation of the elevator brakes needs to be monitored. For example, to monitor functionality of the elevator brake a braking force may be measured. The braking force is a result of the friction between a brake wheel surface and a friction lining material that is pressed by a force towards the brake wheel surface. The work springs are configured to provide the force for the friction pair, i.e. the friction lining and the braking surface.

According to some prior art solutions mechanical switches, e.g. micro switches, proximity switches or optical switches, have been used to monitor the movement of the armature such that the mechanical switch changes its state when the brake is opened and closed. The switches may be arranged, e.g. fixed, to the side, or top, of the elevator brake. However, one drawback of these prior art solutions is that a direct information about the breaking situation cannot be obtained, but instead the movement of the friction lining or armature or other related components is measured. Alternatively, according to one prior art solution, the spring force may be measured from the area in a close vicinity of the work spring acting on a brake lever a distance from the braking area. Thus, again a direct information about the breaking situation cannot be obtained.

Hence, there is need to introduce novel approaches to monitor elevator brakes in which the above described drawbacks may be mitigated at least in part.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an elevator brake. Another objective of the invention is that the elevator brake enables to obtain more information about the operation of the elevator brake and about the braking situation.

The objectives of the invention are reached by an elevator brake as defined by the respective independent claims.

According to an aspect, an elevator brake is provided, wherein the elevator brake comprises: a frame part comprising an electromagnet; a moving armature movably supported on the frame part; at least one energy storage, such as a work spring, arranged between the frame part and the moving armature; a friction lining associated with the moving armature and fitted to engage a braking surface with a normal force originating from the at least one energy storage, to brake movement of an elevator car or to hold the elevator car standstill; and a sensor system comprising one or more sensors mounted into the elevator brake and adapted to sense one or more operational parameters of the elevator brake and/or to directly measure normal force of the friction lining.

The elevator brake may further comprise a hollow carrier coupled to or integrated with the moving armature and adapted to bend when a force is introduced to the friction lining.

Furthermore, at least one sensor of the sensor system may be mounted inside the hollow carrier and adapted to directly measure the normal force of the friction lining.

The at least one sensor of the sensor system may be one of the following: a proximity sensor, a load cell.

Alternatively or in addition, at least one sensor of the sensor system may be adapted to sense deformation of the carrier.

Alternatively or in addition, at least one sensor of the sensor system may be a non-contacting sensor comprising an antenna formed on a PCB board, wherein the PCB board may be mounted inside the elevator brake and fixed by means of insulating resin thereto.

The non-contacting sensor may be an inductive proximity sensor mounted to one of frame part or armature and adapted to sense distance to a metal surface of the other of the frame part or the armature.

Alternatively or in addition, the PCB board may be mounted to the electromagnet.

Alternatively or in addition, at least one sensor of the sensor system may be a temperature sensor mounted on the PCB board.

Alternatively or in addition, at least one sensor of the sensor system may be a current sensor mounted on the PCB board.

Furthermore, a coil of the electromagnet may be wired through the current sensor.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
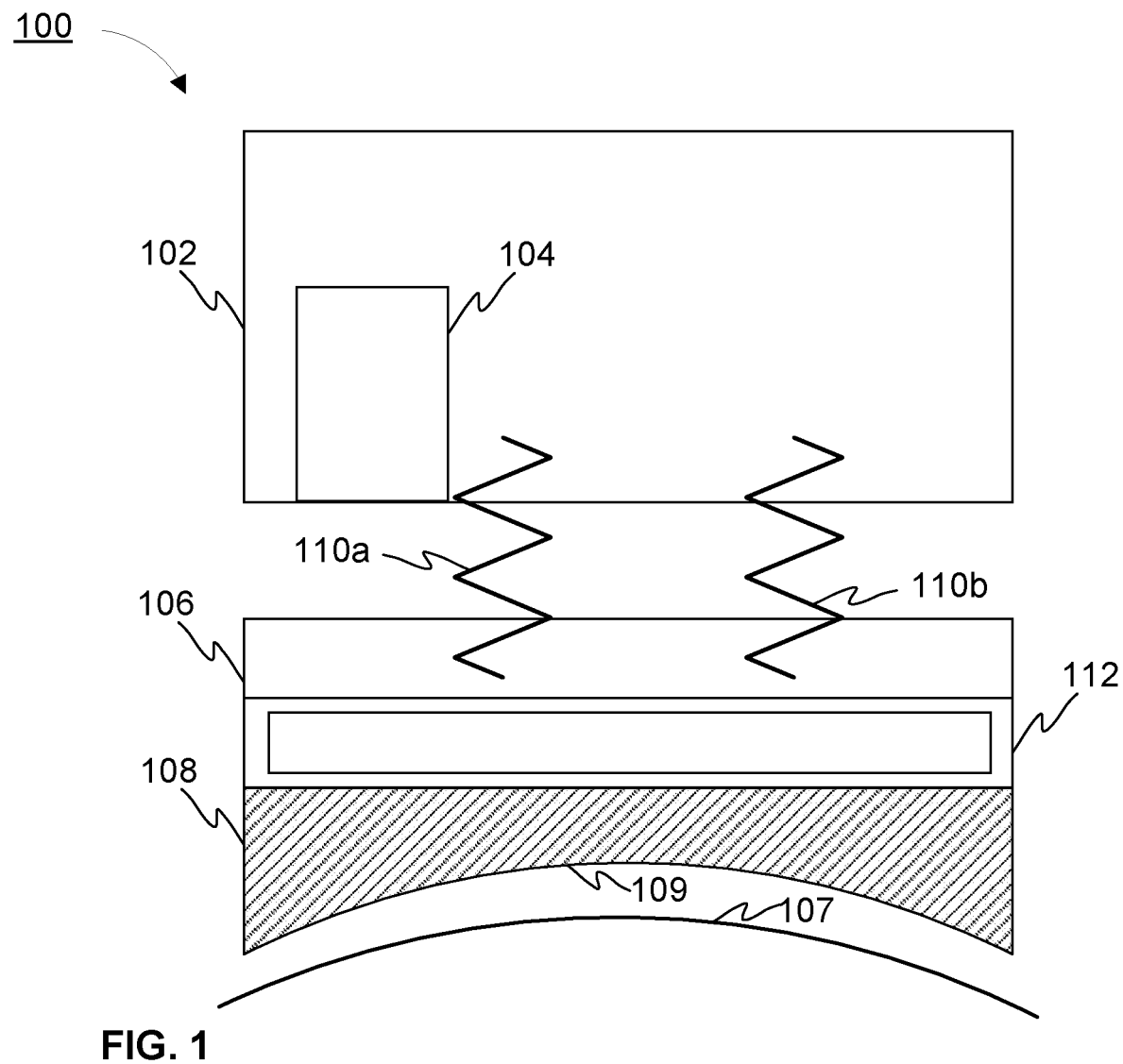
FIG. 1 illustrates schematically an example of an elevator brake wherein the embodiments of the invention may be implemented.

FIG. 1 schematically illustrates an example of an elevator brake 100, wherein the embodiments of the invention may be implemented. The elevator brake 100 comprises a frame part 102, a moving armature 106, and a brake piece 108 with a friction lining 109. The moving armature 106 is moveably supported on the frame part 102 by means of a guide pin (not shown in FIG. 1).

The elevator brake 100 comprises further at least one energy storage, such as a work spring, i.e. a thrust spring, 110a, 100b arranged between the armature 106 and the frame part 102. Furthermore, the frame part 102 comprises at least one electromagnet 104, which is configured to act against braking force generated by the number of work springs 110a, 110b. The elevator brake 100 may be opened by supplying current to the electromagnet 104 and the elevator brake 100 may be applied, i.e. activated, by interrupting the current supply.

The friction lining 109 is associated with the moving armature 106 and fitted to engage a braking surface 107 with a normal force originating from the energy storage to brake movement of an elevator car or to hold the elevator car standstill in an elevator shaft. The braking surface 107 may be for example, a specific area on a traction sheave or a rotating axis of an elevator hoisting machine or on a guide rail of the elevator car.

The elevator brake 100 may be implemented as a hoisting machinery brake, which is mounted to an elevator hoisting machine, and the elevator brake 100 is configured to act on a traction sheave or a rotating axis of the hoisting machine to brake the movement of the traction sheave and thus the movement of the elevator car. Alternatively, the elevator brake 100 may be implemented as an elevator car brake, which is mounted to the elevator car and the elevator brake is configured to act on guide rails to directly brake the movement of the elevator car.

The elevator brake 100 may further comprise a hollow carrier 112 coupled to or integrated with the moving armature 106. In FIG. 1 the hollow carrier 112 is implemented as integrated part of the moving armature 106. The carrier 112 may be adapted to bend or deform when brake is applied, i.e. when the friction lining 109 is pressed against the braking surface 107 with a normal force. The normal force originates from the potential energy of the work springs 110a, 110b acting between the frame part 102 and the armature 106.

The elevator brake 100 further comprises a sensor system (not shown in FIG. 1) comprising one or more sensors mounted into the elevator brake 100 for providing measurement data for monitoring the operation of the elevator brake.

The sensor system may be adapted to sense one or more operational parameters of the elevator brake 100. Alternatively or in addition, the sensor system may be adapted to directly measure normal force of the friction lining 109 through the moving armature 106. A braking force of the elevator brake 100 may be defined based on the measured normal force and a friction coefficient between the braking surface 107 and the friction lining material. This enables that direct information about the breaking force may be obtained.

In case there are a plurality of sensors the individual sensors may be the same type or a different type and configured to measure, i.e. sense, one or more operational parameters of the elevator brake 100. By mounting one or more sensors to the elevator brake 100 the following operational parameters of the elevator brake 100 may e.g. be monitored:

current temperature position normal force distance of at least two parts.

The monitoring of the above-mentioned parameters may be arranged by processing measurement data obtained from one or more of the mentioned sensors of the sensor system. The measurement data may represent directly at least one operational parameter of the elevator brake 100, or the at least one parameter may be generated from the measurement data.

Figure 2:
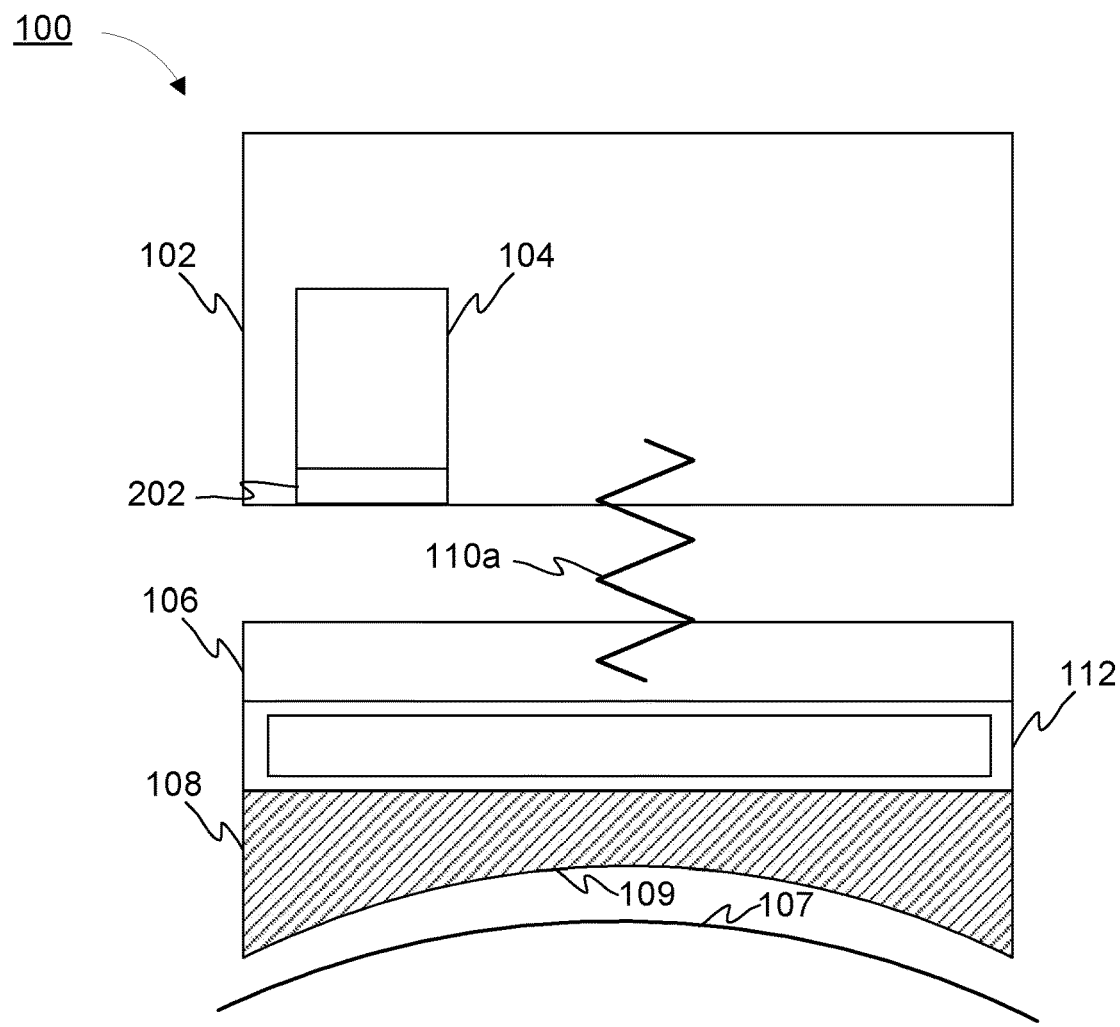
FIG. 2 illustrates schematically an elevator brake according to an embodiment of the invention.
Figure 3:
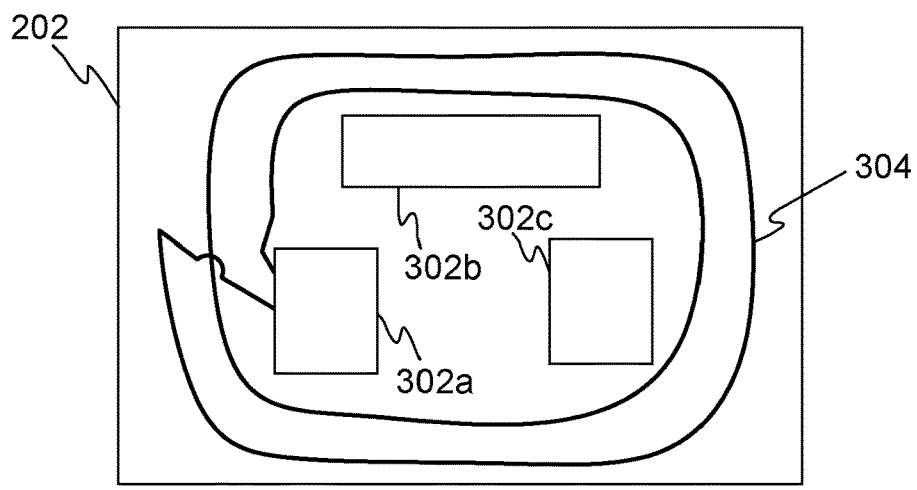
FIG. 3 illustrates schematically an example of a PCB board according to the invention.

Next, it is discussed on providing measurement data for monitoring of at least some of the described operational parameters of the elevator brake 100 and at least some examples of implementations of the sensor system are disclosed. FIG. 2 schematically illustrates an embodiment according to the present invention in which the sensor system of the elevator brake 100 may be adapted to sense one or more operational parameters of the elevator brake 100. At least one sensor 302a-302c of the sensor system may be a non-contacting sensor comprising an antenna 304 formed on a PCB board 202. FIG. 3 schematically illustrates an example of the PCB board 202 according to the invention comprising three sensors, but the sensor system of the elevator brake 100 may comprise any number of sensors considered suitable for the intended use of the sensor system. The PCB board 202 may be mounted inside the elevator brake 100 and fixed by means of insulating resin thereto. Alternatively, the PCB board 202 may be fixed, for example by means of screws, barbed tree plugs or different types of snap-on fixings.

The PCB board 202 may be mounted to the frame part 102 or to the armature 106. When the PCB board is mounted to the frame part 102 it may be fixed to the electromagnet 104, preferably to the end facing towards the armature 106. Typically, the electromagnet 104 may be fixed to the frame part 102 by means of insulating resin. The PCB board 202 may be inserted directly on the electromagnet 104 and resined to the frame part 102 at the same time as the electromagnet 104. Alternatively, the PCB board 202 may be fixed to a groove or a slot provided to the electromagnet 104, preferably to the end facing towards the armature 106, and resined there.

Alternatively, any other type of sensors than the sensor formed on PCB board may be fixed to a groove or a slot provided to the electromagnet 104, preferably to the end facing towards the armature 106, and resined there. Some non-limiting examples of these other type sensors may be linear potentiometer, optical sensor and different type of switches.

The at least one sensor 302a-302c mounted to one of the frame part 102 or the armature 106 may be a proximity sensor adapted to sense distance to a metal surface of the other of the frame part 102 or the armature 106. In other words, the proximity sensor, e.g. an inductive proximity sensor, provides a way to measure absolute position change of moving parts/structures. When the at least one sensor is mounted to the frame part 102 it may be fixed to the electromagnet 104, The magnetic flux generated by the electromagnet 104 does not interfere the inductive proximity sensor, because the magnetic flux is operating on a different frequency band than the excitation of the inductive proximity sensor. This enables that the inductive proximity sensor may be fixed to the electromagnet 104.

Alternatively or in addition, at least one sensor 302a-302c of the sensor system may be a temperature sensor mounted on the PCB board 202. The temperature sensor may be for example thermocouple, NTC resistor, PTC resistor. The temperature sensor may be adapted to sense the temperature of the elevator brake 100. Alternatively, the temperature sensor may be implemented by using the inductive proximity sensor to observe a drift in the measurement signal of the inductive proximity sensor in order to sense the temperature of the elevator brake 100.

Alternatively or in addition, at least one sensor 302a-302c of the sensor system may be a current sensor mounted on the PCB board 202. A coil of the electromagnet 104 may be wired through the current sensor. The current sensor may be adapted to sense the current of the electromagnet 104.

Figure 4:
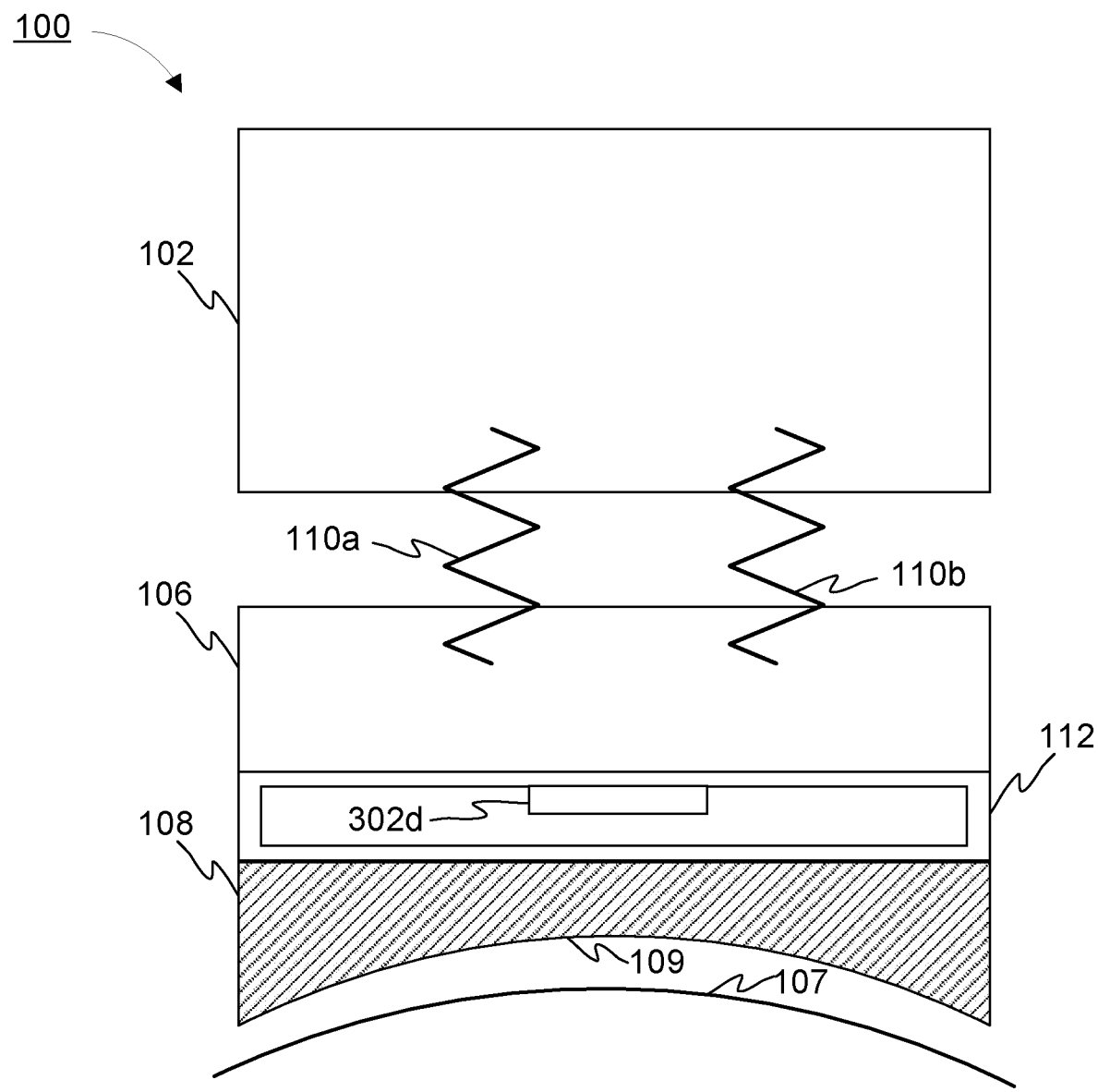
FIG. 4 illustrates schematically an elevator brake according to another embodiment of the invention.

FIG. 4 schematically illustrates an embodiment according to the present invention in which the sensor system of the elevator brake 100 may be adapted to directly define normal force of the friction lining 209. The normal force is focused, i.e. directed, on the friction lining 109 through the moving armature 106.

At least one sensor 302d of the sensor system may be mounted inside the hollow carrier 112 in order to directly measure the normal force focused on the friction lining 109 through the moving armature. In FIG. 4 the hollow carrier 112 is coupled to the moving armature 106, but it may alternatively be integrated with the moving armature 106 as described above. The at least one sensor 302d of the sensor system may be one of the following: a proximity sensor, a load cell. The load cell may be for example a strain gauge, a hydraulic load cell, a pneumatic load cell, or any other load cell type. The proximity sensor may be an inductive proximity sensor or a capacitive proximity sensor capable to measure distance.

Because the at least one sensor 302d is mounted inside the hollow carrier 112 the normal force acting on the friction lining 109 and, consequently, on the braking area, may be measured directly from the braking area, i.e. the area where the friction lining 109 acts on the braking surface 107. In other words, mounting the at least one sensor 302d inside the hollow carrier 112 enables a direct measurement of normal force of friction lining 109, i.e. normal force vectors focusing on the friction lining 109 and affecting directly to the braking surface 107. The direct measurement of the normal force from the braking area improves the accuracy and reliability of the measurement of the normal force. Because the breaking force may be defined from the measured normal force by multiplying the measured normal force by the friction coefficient between the braking surface 107 and the friction lining material, thus also the accuracy and reliability of determination of the braking force may be improved. The direct measurement of normal force enables that information about the breaking force directly from the braking area may be obtained.

Reduction of the normal force indicates a failure or decay of at least one work spring 110a, 110b. Moreover, because the normal force is directly proportional to a brake torque generated by the elevator brake 100, the reduction of the normal force means also a reduction of the brake torque. Thus, the above described direct measurement of the normal force provides a way to monitor the operation of the elevator brake, which enables that a decay or a failure of at least one work spring 110a, 100b may be observed by detecting a reduction in the measured normal force. This allows a detection of a decay or a failure of the work spring 110a, 110b already before the normal force fails totally and the brake torque is lost, i.e. before the work spring 110a, 110b totally decays. This, in turn, allows an early detection of a decay or a failure of the work spring 110a, 110b and thus improves the safety of the elevator at least in part.

Alternatively or in addition, at least one sensor 302d of the sensor system may be a load cell mounted inside the hollow carrier 112 and adapted to sense deformation of the hollow carrier 112. The load cell may be for example a strain gauge, a hydraulic load cell, a pneumatic load cell, or any other load cell type.

The above described elevator brake 100 enables to obtain more information about the operation of an elevator brake 100. The sensor system of the elevator brake 100 according to the invention enables to use a sensor fusion, i.e. to combine measurements of different sensors, such that accuracy and reliability of the monitoring of the operation of the elevator brake 100 may be improved at least partly. Because the sensor system of the elevator brake 100 according to the invention may comprise a plurality of sensors, for example a current sensor adapted to measure the current of the electromagnet 104, an inductive proximity sensor adapted to measure the distance between the brake frame 102 and the armature 106, a strain gauge adapted to measure the amount of normal force of the friction lining 109, and/or a temperature sensor adapted to measure the temperature of the elevator brake 100, the operation of the elevator brake 100 may be monitored by measuring the above operational parameters of the elevator brake 100 individually or by combining several measurements of the above operational parameters of the elevator brake 100, e.g. by measuring brake current in combination with the distance between the brake frame 102 and armature 106 as well as amount of normal force of the friction lining 109. Furthermore, at least some of the embodiments of the invention enables a simple and rugged construction of the elevator brake 100 and an easy assembly. Moreover, at least some of the embodiments of the invention enables that reliable information about the braking situation may be obtained by measuring the normal force of the friction lining. This is due e.g. to the fact that braking force of the elevator brake may be defined based on the normal force as well as a friction coefficient between the braking surface and the friction lining material.

The present invention is herein mainly described by referring to elevator brakes. However, the inventive idea may also be applied to other environments in which the apparatus is configured to convey load, such as people, from one place to another. For example, the invention may be implemented in connection with escalator brakes and with moving walkaway brakes.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An elevator brake comprising:
a frame part comprising an electromagnet;
a moving armature movably supported on the frame part;
at least one energy storage having a first end connected to the frame part and a second end connected to the moving armature;
a friction lining associated with the moving armature and fitted to engage a braking surface with a normal force originating from the at least one energy storage, to brake movement of an elevator car or to hold the elevator car standstill; and
a sensor system comprising one or more sensors mounted into the elevator brake and adapted to sense one or more operational parameters of the elevator brake and/or to directly measure a normal force of the friction lining.

2. The elevator brake according to claim 1 further comprising a hollow carrier coupled to or integrated with the moving armature and adapted to bend when a force is introduced to the friction lining.

3. The elevator brake according to claim 2, wherein at least one sensor of the sensor system is mounted inside the hollow carrier and adapted to directly measure the normal force of the friction lining.

4. The elevator brake according to claim 3, wherein the at least one sensor of the sensor system is one of the following: a proximity sensor, or a load cell.

5. The elevator brake according to claim 2, wherein at least one sensor of the sensor system is adapted to sense deformation of the carrier.

6. The elevator brake according to claim 1, wherein the at least one energy storage is a work spring.

7. The elevator brake according to claim 2, wherein at least one sensor of the sensor system is a non-contacting sensor comprising an antenna formed on a PCB board, wherein the PCB board is mounted inside the elevator brake and is fixed by means of an insulating resin thereto.

8. The elevator brake according to claim 3, wherein at least one sensor of the sensor system is a non-contacting sensor comprising an antenna formed on a PCB board, wherein the PCB board is mounted inside the elevator brake and is fixed by means of an insulating resin thereto.

9. The elevator brake according to claim 1, wherein the moving armature moves linearly.

10. The elevator brake according to claim 1, wherein the at least one energy storage biases the moving armature in a first direction and the electromagnet biases the moving armature in a second direction opposite the first direction.

11. An elevator brake comprising:
a frame part comprising an electromagnet
a moving armature movably supported on the frame part;
at least one energy storage arranged between the frame part and the moving armature;
a friction lining associated with the moving armature and fitted to engage a braking surface with a normal force originating from the at least one energy storage, to brake movement of an elevator car or to hold the elevator car standstill; and
a sensor system comprising one or more sensors mounted into the elevator brake and adapted to sense one or more operational parameters of the elevator brake and/or to directly measure a normal force of the friction lining,
wherein at least one sensor of the sensor system is a non-contacting sensor comprising an antenna formed on a PCB board, wherein the PCB board is mounted inside the elevator brake and is fixed by means of an insulating resin thereto.

12. The elevator brake according to claim 11, wherein the non-contacting sensor is an inductive proximity sensor mounted to one of the frame part or the moving armature and adapted to sense distance to a metal surface of the other of the frame part or the moving armature.

13. The elevator brake according to claim 11, wherein the PCB board is mounted to the electromagnet.

14. The elevator brake according to claim 11, wherein at least one sensor of the sensor system is a temperature sensor mounted on the PCB board.

15. The elevator brake according to claim 11, wherein at least one sensor of the sensor system is a current sensor mounted on the PCB board.

16. The elevator brake according to claim 15, wherein a coil of the electromagnet is wired through the current sensor.

17. The elevator brake according to claim 12, wherein the PCB board is mounted to the electromagnet.

18. The elevator brake according to claim 12, wherein at least one sensor of the sensor system is a temperature sensor mounted on the PCB board.

19. The elevator brake according to claim 13, wherein at least one sensor of the sensor system is a temperature sensor mounted on the PCB board.

20. The elevator brake according to claim 14, wherein at least one sensor of the sensor system is a current sensor mounted on the PCB board.

* * * * *